US012085420B2

(12) United States Patent
Kim et al.

(10) Patent No.: US 12,085,420 B2
(45) Date of Patent: Sep. 10, 2024

(54) ANGLE MEASUREMENT SYSTEM BASED ON MAGNETIC METHOD AND MEASUREMENT METHOD THEREFOR

(71) Applicant: SNA Co., Ltd., Yongin-si (KR)

(72) Inventors: Je Kook Kim, Seoul (KR); Kyoung Soo Kwon, Gwacheon-si (KR); Chae Dong Go, Hwaseong-si (KR); Suk Jung Lee, Yongin-si (KR)

(73) Assignee: SNA CO., LTD., Yongin-si (KR)

( * ) Notice: Subject to any disclaimer, the term of this patent is extended or adjusted under 35 U.S.C. 154(b) by 88 days.

(21) Appl. No.: 17/967,377

(22) Filed: Oct. 17, 2022

(65) Prior Publication Data

US 2023/0140330 A1 May 4, 2023

(30) Foreign Application Priority Data

Nov. 4, 2021 (KR) .......................... 10-2021-0150355
Jun. 3, 2022 (KR) .......................... 10-2022-0067951

(51) Int. Cl.
*G01D 5/14* (2006.01)
(52) U.S. Cl.
CPC .................................... *G01D 5/145* (2013.01)
(58) Field of Classification Search
CPC ....................................................... G01D 5/145
See application file for complete search history.

(56) References Cited

U.S. PATENT DOCUMENTS 5,012,238 A * 4/1991 Hayashi ................ H03M 1/287
341/172
2022/0196435 A1 * 6/2022 Schott .................. G01D 5/2452

FOREIGN PATENT DOCUMENTS

JP          2020193833 A     12/2020
KR       20200002823 A      1/2020

* cited by examiner

*Primary Examiner* — Walter L Lindsay, Jr.
*Assistant Examiner* — Milton Gonzalez
(74) *Attorney, Agent, or Firm* — CANTOR COLBURN LLP

(57) ABSTRACT

An angle measurement system using a magnet and provided with first and second tracks includes an absolute angle calculation unit configured to calculate an absolute angle of a position of the magnet by using a 1-1th digital signal obtained by measuring a magnetic field signal of the first track and converted into a digital signal, a 1-2th digital signal obtained by measuring the magnetic field signal of the first track and converted into a digital signal, a 2-1th digital signal obtained by measuring a magnetic field signal of the second track and converted into a digital signal, and a 2-2th digital signal obtained by measuring the magnetic field signal of the second track and converted into a digital signal.

10 Claims, 10 Drawing Sheets

Fig. 5
P(1-1) to P(1-4) respectively represent
1-1th difference value to 1-4th difference value.
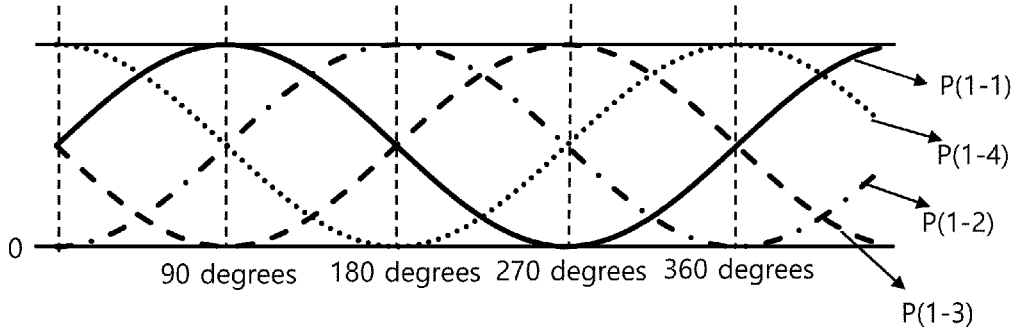
SignP(1-1) to SignP(1-4) respectively represent
1-1th signed difference value to 1-4th signed difference value.
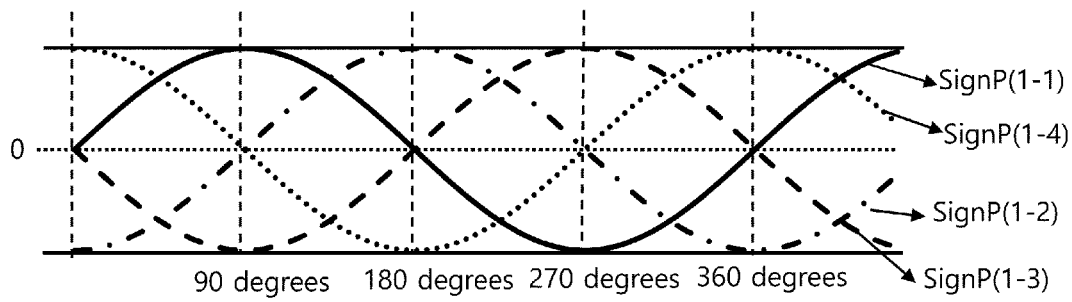
ShiftP(1-1) to ShiftP(1-4) respectively represent
1-1th shift difference value to 1-4th shift difference value
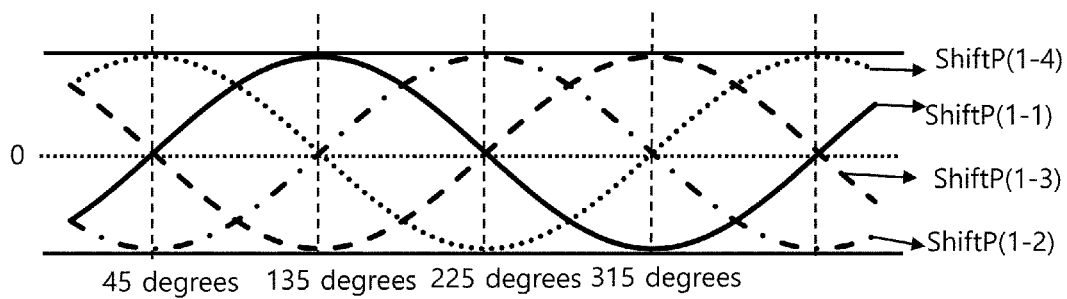

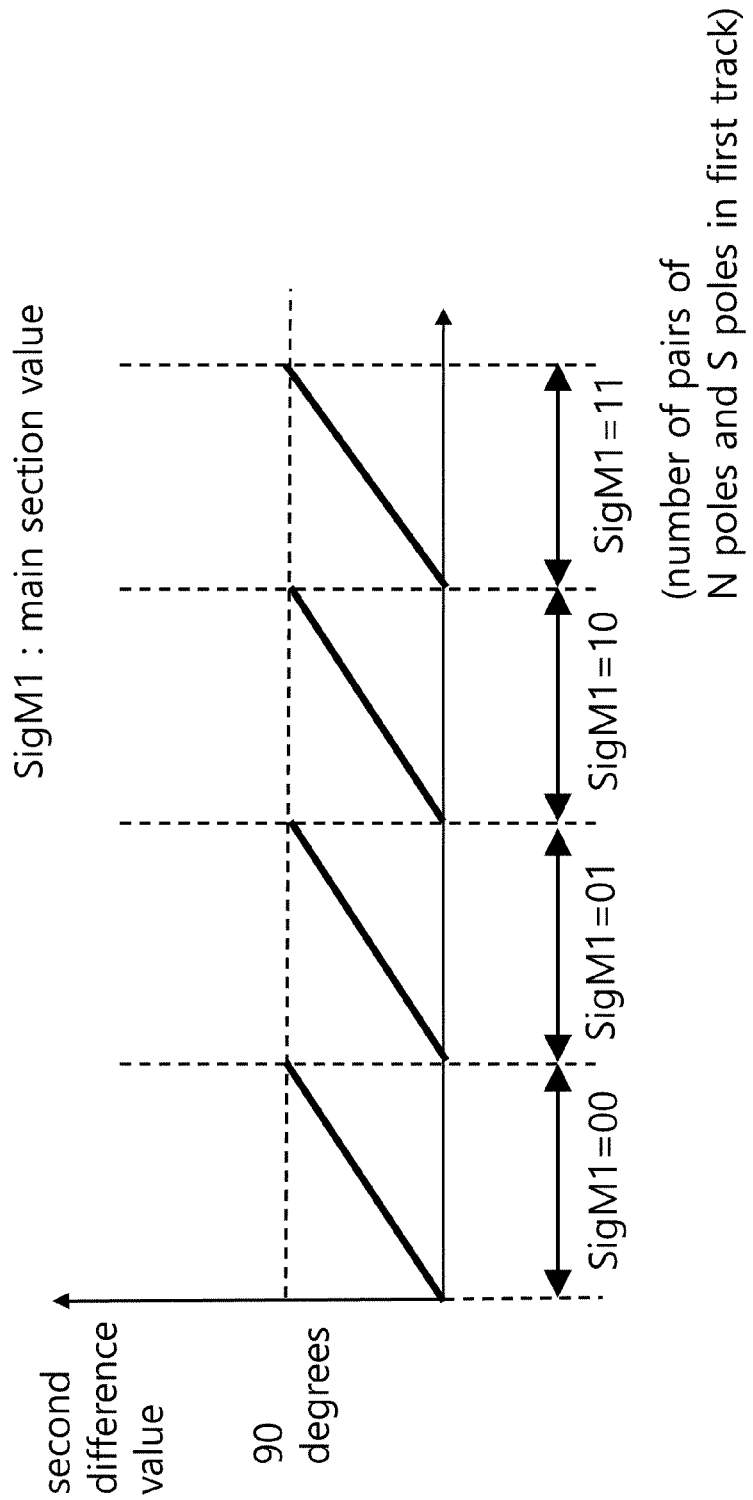

ANGLE MEASUREMENT SYSTEM BASED ON MAGNETIC METHOD AND MEASUREMENT METHOD THEREFOR

BACKGROUND OF THE INVENTION

Field of the Invention

The present disclosure relates to an angle measurement system based on a magnetic method and a measurement method therefor.

Description of the Related Art

An angle measurement system based on a magnetic method is a system for measuring an angle of a magnet attached to a rotor of a motor. In this case, the magnet provided with two tracks TR1 and TR2 may be used in order to increase resolution of angle measurement. A magnetic encoder may include a magnet and an angle measurement system that measures an angle according to rotation of the magnet.

FIG. 1 is an explanatory view of an angle measurement system based on a magnetic method and provided with two tracks TR1 and TR2. An encoder chip C is preferably attached while having a gap with respect to the magnet provided with the two annular tracks TR1 and TR2. In addition, the encoder chip C includes sensors H1 and H2 capable of measuring a magnetic field of each of the two tracks TR1 and TR2.

When a motor rotates, the magnetic fields change, and angle information according to the rotation of the magnet, that is, rotation angles of the motor, may be measured by measuring the changed magnetic fields by the sensors H1 and H2.

SUMMARY OF THE INVENTION

The present disclosure is devised in order to solve the technical problems as described above, and an objective of the present disclosure is to provide an angle measurement system based on a magnetic method and a measurement method therefor capable of measuring an absolute angle at a time when a motor is stopped and/or rotated with high resolution.

An angle measurement system configured to use a magnet and provided with a first track and a second track is configured to include an absolute angle calculation unit for calculating an absolute angle of a position of the magnet by using a 1-1th digital signal obtained by measuring a magnetic field signal of the first track and converted into a digital signal, a 1-2th digital signal obtained by measuring the magnetic field signal of the first track and converted into a digital signal, a 2-1th digital signal obtained by measuring a magnetic field signal of the second track and converted into a digital signal, and a 2-2th digital signal obtained by measuring the magnetic field signal of the second track and converted into a digital signal. In addition, the 1-1th digital signal and the 1-2th digital signal are sinusoidal signals having a phase difference of 90 degrees from each other, and the 2-1th digital signal and the 2-2th digital signal are sinusoidal signals having a phase difference of 90 degrees from each other.

An absolute angle of the position of the magnet may be configured to include at least one piece of data including: main section values obtained by dividing one rotation of 360 degrees of the magnet into a first main section to a fourth main section, which are four 90 degree sections; sub-section values obtained by dividing each of the first main section to the fourth main section into a plurality of sections by a value using the phase difference between the magnetic field signal of the first track and the magnetic field signal of the second track; first signal section values obtained by dividing the magnetic field signal of the first track into four first signal sections by using a sign of the 1-1th digital signal and a sign of the 1-2th digital signal; and lower section values calculated by the 1-1th digital signal and the 1-2th digital signal for each first signal section value.

Specifically, the absolute angle calculation unit may be configured to include: a main section value calculator for calculating main section values that divides one rotation of 360 degrees of the magnet into the first main section to the fourth main section, which are the four 90 degree sections; an angle output part for outputting absolute angle data of a position of the magnet comprising the main section values; a first signal section value calculator for calculating first signal section values obtained by dividing the magnetic field signal of the first track into four first signal sections by using a sign of the 1-1th digital signal and a sign of the 1-2th digital signal; and a lower section value calculator for calculating lower section values by the 1-1th digital signal and the 1-2th digital signal for each first signal section value.

In addition, the absolute angle calculation unit may be configured to further include: a first difference value calculator for calculating a 1-1th difference value to 1-4th difference value, which are values each embedding the phase difference between the magnetic field signal of the first track and the magnetic field signal of the second track by using the 1-1th digital signal, the 1-2th digital signal, the 2-1th digital signal, and the 2-2th digital signal; a data converter for converting each of the 1-1th difference value to the 1-4th difference value into a 1-1th signed difference value to a 1-4th signed difference value, which are signed values; and a shift difference value calculator for calculating a 1-1th shift difference value to a 1-4th shift difference value, which are obtained by phase shifting each of the 1-1th difference value to the 1-4th difference value by 45 degrees by using a plurality of the 1-1th signed difference value to the 1-4th signed difference value.

The main section values may be calculated by using values each embedding the phase difference between the magnetic field signal of the first track and the magnetic field signal of the second track.

In addition, the absolute angle calculation unit may be configured to further include a sub-section value calculator for calculating sub-section values corresponding one of the 1-1th shift difference value to the 1-4th shift difference value to a 1-1th sub-section to a 1-Mth sub-section for each main section value.

In addition, the absolute angle calculation unit may be configured to further include: a first shift section value calculator for calculating a first signal section value shifted by one section by shifting the first signal section value by one first signal section in a first direction; a second shift section value calculator for calculating a first signal section value shifted by two sections by shifting the first signal section value by two first signal sections in the first direction; and a third shift section value calculator for calculating a first signal section value shifted by three sections by shifting the first signal section value by three first signal sections in the first direction, wherein the first direction is either a left direction or a right direction of a register used as the first signal section value calculator.

In addition, the absolute angle calculation unit may be configured to further include: a first signal section period calculator for calculating, by using the first signal section values, a first signal section period in which the four first signal sections are repeated; a second signal section value calculator for calculating second signal section values divided into four second signal sections by using a sign of the 2-1th digital signal and a sign of the 2-2th digital signal; and a second difference value calculator for calculating each second difference value that is a difference of a change point between the corresponding first signal section value and the second signal section value by sequentially using one of the unshifted first signal section value, the first signal section value shifted by one section, the first signal section value shifted by two sections, and the first signal section value shifted by three sections, wherein the main section values are calculated by using the second difference values.

The absolute angle calculation step may be configured to further include a sub-section value calculator for calculating sub-section values respectively corresponding the first main section to the fourth main section into P sections of a 2-1th sub-section to a 2-Pth sub-section by using a value obtained by dividing the second difference values by the first signal section period.

According to the angle measurement system based on the magnetic method and the measurement method therefor of the present disclosure, the absolute angle at the time when the motor is stopped and/or rotated may be measured with the high resolution.

BRIEF DESCRIPTION OF THE DRAWINGS

FIG. 5 illustrates waveform diagrams of a 1-1th difference value to a 1-4th difference value, a 1-1th signed difference value to a 1-4th signed difference value, and a 1-1th shift difference value to a 1-4th shift difference value.

FIG. 10 is a waveform diagram illustrating a result of the calculated second difference values.

DETAILED DESCRIPTION OF THE INVENTION

Hereinafter, an angle measurement system based on a magnetic method and a measurement method therefor according to an exemplary embodiment of the present disclosure is described in detail with reference to the accompanying drawings.

Naturally, it is apparent that the following exemplary embodiment of the present disclosure are not intended to limit or restrict the scope of the present disclosure, but only to embody the present disclosure. What can be easily inferred by those skilled in the art to which the present disclosure pertains from the detailed description and examples of the present disclosure is construed as belonging to the scope of the present disclosure.

Figure 1:
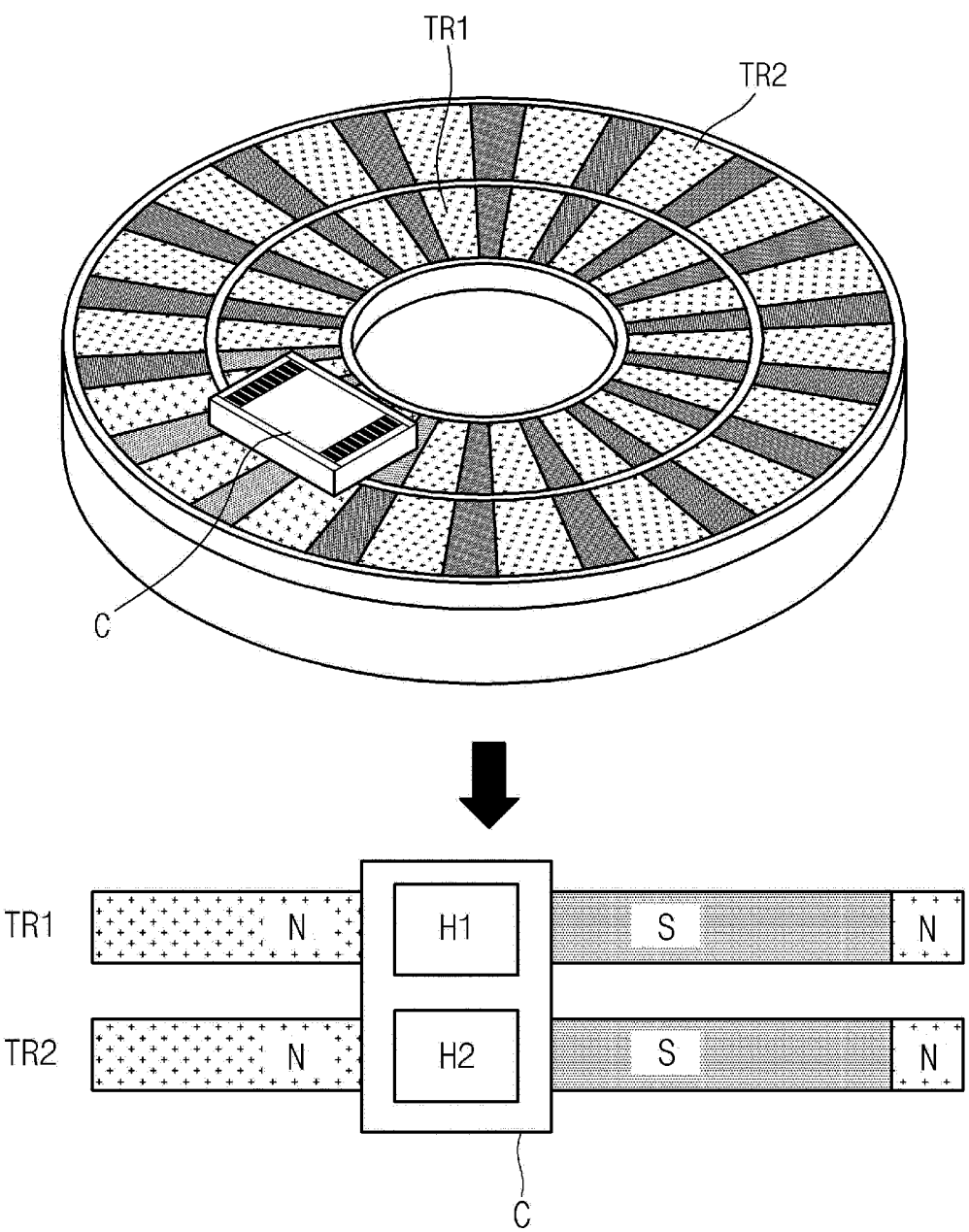
FIG. 1 is an explanatory view of an angle measurement system based on a magnetic method and provided with two tracks.

The angle measurement system based on the magnetic method is a system for measuring an angle of a magnet attached to a rotor of a motor. In this case, in order to increase resolution used to measure the angles, the magnet provided with two annular tracks TR1 and TR2 as shown in FIG. 1 may be used. A magnetic encoder may include the magnet and the angle measurement system that measures the angle according to the rotation of the magnet.

That is, preferably, the magnet used in the magnetic encoder for measuring the angle of the present disclosure includes: a first track TR1 of an annular shape in which N poles and S poles are alternately and repeatedly connected to each other; and a second track TR2 of an annular shape foamed to contact with an inner side or an outer side of the first track TR1 and provided with a plurality of unit poles connected to each other. Alternatively, the second track TR2 may be configured in a form in contact with an upper side or a lower side of the first track TR1.

In addition, each of the plurality of unit poles is the same size and has one polarity of a plurality of polarities including an N pole and a S pole. That is, each of the unit poles may be the N pole or the S pole.

However, unlike FIG. 1, in the magnet used in the magnetic encoder for measuring the angle of the present disclosure, it is preferable that the number of pairs of N poles and S poles included in each of the two tracks TR1 and TR2 differs, so that after a point where an N pole and a S pole in each of the two tracks TR1 and TR2 coincide is passed, the N poles and the S poles in the two tracks TR1 and TR2 are configured to be gradually shifted from alignment as an angle increases.

Specifically, in the magnet used in the magnetic encoder for measuring the angle of the present disclosure, in a case where U numbers of pairs of N poles and S poles are alternately and repeatedly connected to each other in the first track TR1 and W numbers of pairs of N poles and S poles are alternately and repeatedly connected to each other in the second track TR1, when the number U and the number W are different from each other, unit pole positions of the N poles or S poles of the first track TR1 and second track TR2 are slightly shifted from each other according to the rotation of the motor, and thus a phase difference occurs between a magnetic field signal of the first track TR1 and a magnetic field signal of the second track TR2. For reference, the first track TR1 and the second track TR2 may be designed respectively as in a case where the number U is 32 and the number W is 31.

Figure 2:
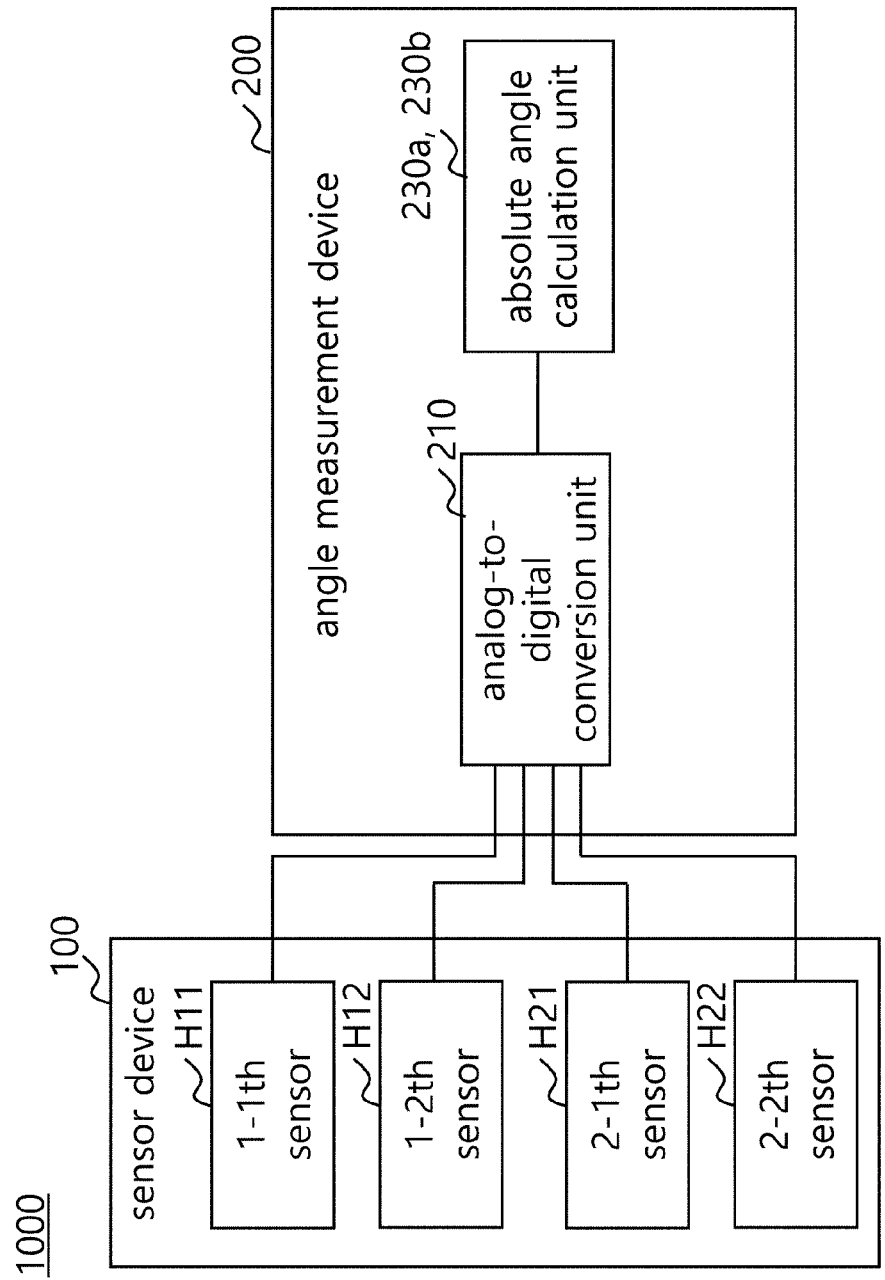
FIG. 2 is a block diagram illustrating the angle measurement system based on the magnetic method according to an exemplary embodiment.

FIG. 2 is a block diagram illustrating the angle measurement system 1000 based on the magnetic method according to the exemplary embodiment. The angle measurement system 1000 based on the magnetic method according to the exemplary embodiment may be implemented in a form of the encoder chip C shown in FIG. 1.

As may be seen from FIG. 2, the angle measurement system 1000 based on the magnetic method according to the exemplary embodiment is configured to include a sensor device 100 and an angle measurement device 200.

The sensor device 100 may be configured to include at least one 1-1th sensor H11, at least one 1-2th sensor H12, at least one 2-1th sensor H21, and at least one 2-2th sensor H22.

Various magnetic sensors such as a Hall sensor, a magnetoresistive element, and the like may be used for the at least one 1-1th sensor H11, at least one 1-2th sensor H12, at least one 2-1th sensor H21, and at least one 2-2th sensor H22, which are included in the sensor device 100.

Each of the at least one 1-1th sensor H11 and the at least one 1-2th sensor H12 measures the magnetic field signal of the first track TR1. In this case, when it is assumed that the at least one 1-1th sensor H11 measures the magnetic field signal of the first track TR1 in response to a sine signal, the at least one 1-2th sensor H12 may measure the magnetic field signal of the first track TR1 in response to a cosine signal. That is, an output of the at least one 1-1th sensor H11 and an output of the at least one 1-2th sensor H12 are sinusoidal signals, and the at least one 1-1th sensor H11 and the at least one 1-2th sensor H12 may be arranged so as to have a phase difference of 90 degrees from each other.

For reference, when the magnetic field signal of the first track TR1 is measured in a form of a sine signal and a cosine signal, it is preferable that two 1-1th sensors H11 and two 1-2th sensors H12 are arranged respectively when differential signals are used in the angle measurement device 200.

Similarly, each of at least one 2-1th sensor H21 and at least one 2-2th sensor H22 measures a magnetic field signal of the second track TR2. In this case, when it is assumed that the at least one 2-1th sensor H21 measures the magnetic field signal of the second track TR2 in response to a sine signal, the at least one 2-2th sensor H22 may measure the magnetic field signal the second track TR2 in response to a cosine signal. That is, an output of the at least one 2-1th sensor H21 and an output of the at least one 2-2th sensor H22 are sinusoidal signals, and the at least one 2-1th sensor H21 and the at least one 2-2th sensor H22 may be arranged so as to have a phase difference of 90 degrees.

For reference, when the magnetic field signal of the second track TR2 is measured in the form of a sine signal and a cosine signal, it is preferable that two 2-1th sensor H21 and two 2-2th sensors H22 are arranged respectively when the differential signals are used in the angle measurement device 200.

The angle measurement device 200 may be configured to include an analog-to-digital conversion unit 210 and absolute angle calculation units 230*a* and 230*b*. Each of the analog-to-digital conversion unit 210 and the absolute angle calculation units 230*a* and 230*b* may be configured to include at least one of a circuit, a processor, and a memory.

The analog-to-digital conversion unit 210 serves to receive an input of analog signals that are outputs of a plurality of sensors H11 and H12 to convert the input analog signals to digital signals of a 1-1th digital signal and a 1-2th digital signal, thereby outputting the digital signals. In addition, The analog-to-digital conversion unit 210 serves to receive an input of analog signals that are outputs of a plurality of sensors H21 and H22 to convert the input analog signals to digital signals of a 2-1th digital signal and a 2-2th digital signal, thereby outputting the digital signals. The analog-to-digital conversion unit 210 may be provided with a separate analog-to-digital converter for each of the 1-1th digital signal, the 1-2th digital signal, the 2-1th digital signal, and the 2-2th digital signal. Alternatively, in one analog-to-digital converter, the analog-to-digital conversion unit 210 may share the analog-to-digital converter in a way of converting the plurality of the 1-1th digital signal, the 1-2th digital signal, the 2-1th digital signal, and the 2-2th digital signal by using a multiplexer.

Specifically, the analog-to-digital conversion unit 210 serves to receive the input of the analog signals of the output of the at least one 1-1th sensor H11 and the output of the at least one 1-2th sensor H12, which respectively measure the magnetic field signal of the first track TR1, convert the input analog signals to the digital signals of the 1-1th digital signal and the 1-2th digital signal, and output the digital signals. In addition, the 1-1th digital signal and the 1-2th digital signal are sinusoidal signals and have a phase difference of 90 degrees from each other.

Similarly, the analog-to-digital conversion unit 210 serves to receive the input of the analog signals of the output of the at least one 2-1th sensor H21 and the output of the at least one 2-2th sensor H22, which respectively measure the magnetic field signal of the second track TR2, convert the input analog signals to the digital signals of the 2-1 digital signal and the 2-2 digital signal, and output the digital signals. In addition, the 2-1th digital signal and the 2-2th digital signal are sinusoidal signals and have a phase difference of 90 degrees from each other.

The absolute angle calculation units 230*a* and 230*b* serve to calculate an absolute angle of a position of the magnet by using the 1-1th digital signal, the 1-2th digital signal, the 2-1th digital signal, and the 2-2th digital signal. The absolute angle of the position of the magnet refers to an angle rotated from a reference position of the magnet.

The absolute angle of the position of the magnet is configured to include at least one piece of data, including: main section values obtained by dividing one rotation of 360 degrees of the magnet into four 90 degree sections, which are a first main section to a fourth main section; sub-section values obtained by dividing each of the first main section to the fourth main section into a plurality of sections by a value using a phase difference between a magnetic field signal of a first track and a magnetic field signal of a second track; first signal section values obtained by dividing the magnetic field signal of the first track into four first signal sections by using a sign of a 1-1th digital signal and a sign of a 1-2th digital signal; and lower section values calculated by the 1-1th digital signal and the 1-2th digital signal for each of the first signal section values.

Figure 3:
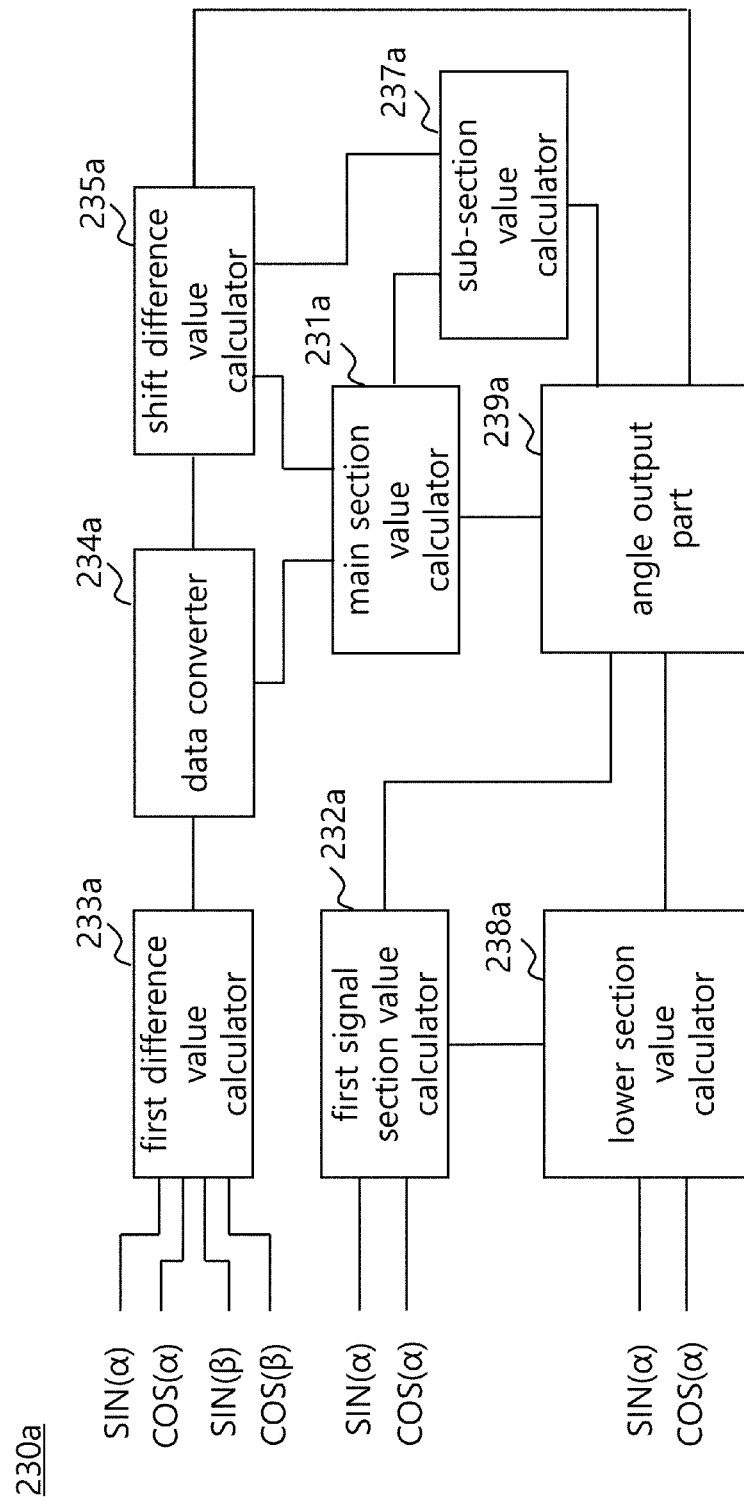
FIG. 3 is a block diagram illustrating an absolute angle calculation unit according to a first exemplary embodiment.

FIG. 3 is a block diagram illustrating an absolute angle calculation unit 230*a* according to a first exemplary embodiment.

As may be seen from FIG. 3, the absolute angle calculation unit 230*a* according to the first exemplary embodiment may be configured to include a main section value calculator 231*a*, a first signal section value calculator 232*a*, a first difference value calculator 233*a*, a data converter 234*a*, a shift difference value calculator 235*a*, a sub-section value calculator 237*a*, a lower section value calculator 238*a*, and an angle output part 239*a*.

For reference, the absolute angle calculation unit 230*a* according to the first exemplary embodiment may be used to calculate a rotation angle of a motor at a stopped position when the rotation of the motor is stopped.

The main section value calculator 231*a* calculates the main section values for dividing one rotation of 360 degrees of the magnet into a first main section to a fourth main section, which are four 90 degree sections. For reference, the main section values may be calculated by various methods.

In addition, the first signal section value calculator 232*a* uses a sign of a 1-1th digital signal and a sign of a 1-2th digital signal, so as to calculate first signal section values obtained by dividing the magnetic field signal of the first track TR1 into four first signal sections.

Figure 4:
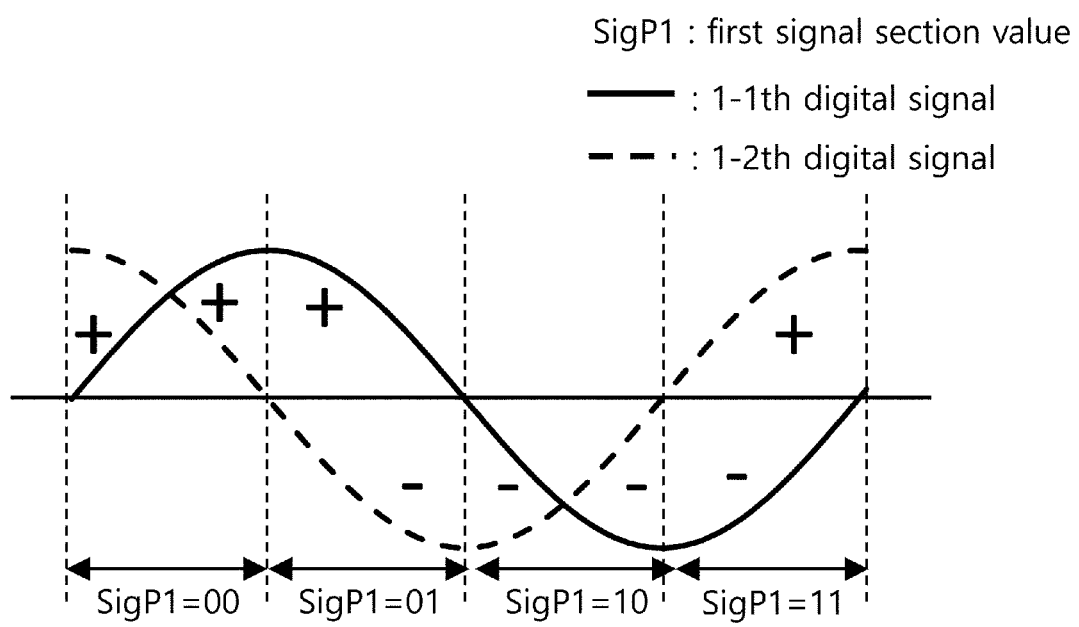
FIG. 4 is an explanatory view illustrating first signal section values.

FIG. 4 is an explanatory view illustrating the first signal section values.

As may be seen from FIG. 4, the first signal section values are values obtained by dividing the magnetic field signal of the first track TR1 into four first signal sections by using, i.e., combining, the sign of the 1-1th digital signal and the sign of the 1-2th digital signal.

For example, in a case where it is assumed that a first signal section value is set as a 2-bit signal, the first signal section value may be set to "00" when a sign of a 1-1th digital signal and a sign of a 1-2th digital signal are both positive numbers, and the first signal section value may be set as "01" when the sign of the 1-1th digital signal and the sign of the 1-2th digital signal are respectively positive and negative. Similarly, the first signal section value may be set to "10" when the sign of the 1-1th digital signal and the sign of the 1-2th digital signal are both negative numbers, and the first signal section value may be set as "11" when the sign of the 1-1th digital signal and the sign of the 1-2th digital signal are respectively negative and positive.

The first difference value calculator 233a may calculate a 1-1th difference value to a 1-4th difference value as respective unsigned values, by using the 1-1th digital signal, the 1-2th digital signal, the 2-1 digital signal, and the 2-2 digital signal.

The 1-1th difference value to the 1-2th difference value may be calculated by a preset [Equation 1].

$$P(1-1)=\{SIN(\alpha)-SIN(\beta)\}^2+\{COS(\alpha)-COS(\beta)\}^2$$

$$P(1-2)=\{SIN(\alpha)-SIN(\beta)\}^2+\{COS(\alpha)-COS(\beta\_B)\}^2 \quad \text{[Equation 1]}$$

In Equation 1, P(1–1) to P(1–2) respectively represent a 1-1th difference value to a 1-2th difference value, SIN($\alpha$) represents a 1-1th digital signal, COS($\alpha$) represents a 1-2th digital signal, SIN($\beta$) represents a 2-1th digital signal, cos($\beta$) represents a second digital signal, and $\beta\_B$ represents an inverted signal of $\beta$, that is, $-\beta$.

In addition, the 1-3th difference value is a signal obtained by inverting the 1-1th difference value, and the 1-4th difference value is a signal obtained by inverting the 1-2th difference value. That is, the 1-1th difference value to the 1-4th difference value are values each having a phase difference by 90 degrees in turn.

For reference, when a trigonometric equation is used, the 1-1th difference value may be expressed as in Equation 2 below.

$$P(1-1) = \{SIN(\alpha) - SIN(\beta)\}^2 + \{COS(\alpha) - COS(\beta)\}^2 = \quad \text{[Equation 2]}$$
$$SIN^2(\alpha) - 2SIN(\alpha)SIN(\beta) + SIN^2(\beta) +$$
$$COS^2(\alpha) - 2COS(\alpha)COS(\beta) + COS^2(\beta) =$$
$$2 - 2\{COS(\alpha)COS(\beta) + SIN(\alpha)SIN(\beta)\} = 2\{1 - COS(\alpha - \beta)\}$$

As may be seen from [Equation 2], each of the 1-1th difference value to the 1-4th difference value is a value embedding ($\alpha$-$\beta$), which is a phase difference between a magnetic field signal of the first track TR1 and a magnetic field signal of the second track TR2.

The data converter 234a serves to convert each of the 1-1th difference value to the 1-4th difference value into the 1-1th signed difference value to the 1-4th signed difference value, which are signed values.

Specifically, each of the 1-1th signed difference value to the 1-4th signed difference value may be calculated as in Equation 3 below.

SignP(1–1)=P(1–1)–P1(SUM)

SignP(1–2)=P(1–2)–P1(SUM)

SignP(1–3)=P(1–3)–P1(SUM)

SignP(1–4)=P(1–4)–P1(SUM)  [Equation 3]

In [Equation 3], SignP(1–1) to SignP(1–4) respectively represent a 1-1th signed difference value to 1-4th signed difference value, P(1–3) represents a 1-3th difference value, P(1–4) represents a 1-4th difference value, and P1(SUM) may be expressed as in Equation 4 below.

$$P1(SUM) = \frac{1}{4}\{P(1-1) + P(1-2) + P(1-3) + P(1-4)\} \quad \text{[Equation 4]}$$

The shift difference value calculator 235a calculates a 1-1th shift difference value to a 1-4th shift difference value, which are obtained by phase shifting each of the 1-1th difference value to the 1-4th difference value by 45 degrees by using a plurality of the 1-1th signed difference value to the 1-4th signed difference value.

Specifically, the 1-1th shift difference value to the 1-4th shift difference value may be calculated as in Equation 5 below.

ShiftP(1–1)=SignP(1–4)–SignP(1–3)

ShiftP(1–2)=SignP(1–4)–SignP(1–3)

ShiftP(1–3)=SignP(1–4)–SignP(1–3)

ShiftP(1–4)=SignP(1–4)–SignP(1–3)  [Equation 5]

In Equation 5, ShiftP(1–1) to ShiftP(1–4) respectively represent a 1-1th shift difference value to a 1-4th shift difference value. In addition, B_SignP(1–4) represents a value obtained by inverting the 1-4th signed difference value.

FIG. 5 illustrates waveform diagrams of the 1-1th difference value to the 1-4th difference value, the 1-1th signed difference value to the 1-4th signed difference value, and the 1-1th shift difference value to the 1-4th shift difference value, which are respectively calculated by the first difference value calculator 233a, the data converter 234a, and the shift difference value calculator 235a.

As may be seen from FIG. 5, each of the 1-1th difference value to the 1-4th difference value has a maximum value at 90 degrees, 180 degrees, 270 degrees, and 360 degrees during one rotation of 360 degrees of the magnet, and appears in the form of a sine wave with a period of 360 degrees.

For reference, the main section values may be calculated by using values calculated by using the 1-1th difference value to the 1-4th difference value. Specifically, the main section values may be calculated by using the 1-1th signed difference value to the 1-4th signed difference value, which are the values using the 1-1th difference value to the 1-4th difference value. However, each of the 1-1th signed difference value to the 1-4th signed difference value also include a phase difference between the magnetic field signal of the first track TR1 and the magnetic field signal of the second track TR2. That is, the main sections value may be calculated by using each value embedding the phase difference between the magnetic field signal of the first track and the magnetic field signal of the second track.

For example, the main section values may be set as "00", "01", "10", and "11" with two bits by comparing a value of all four bits, in which a sign of each of the 1-1th signed difference value to the 1-4th signed difference value is expressed as one bit, with a reference value 1 to a reference value 4.

For each main section value, the sub-section value calculator 237a calculates sub-section values that correspond one of the 1-1th shift difference value to 1-4th shift difference value to the 1-1th sub-section to 1-Mth sub-section. Here, M is a natural number greater than or equal to two.

Figure 6:
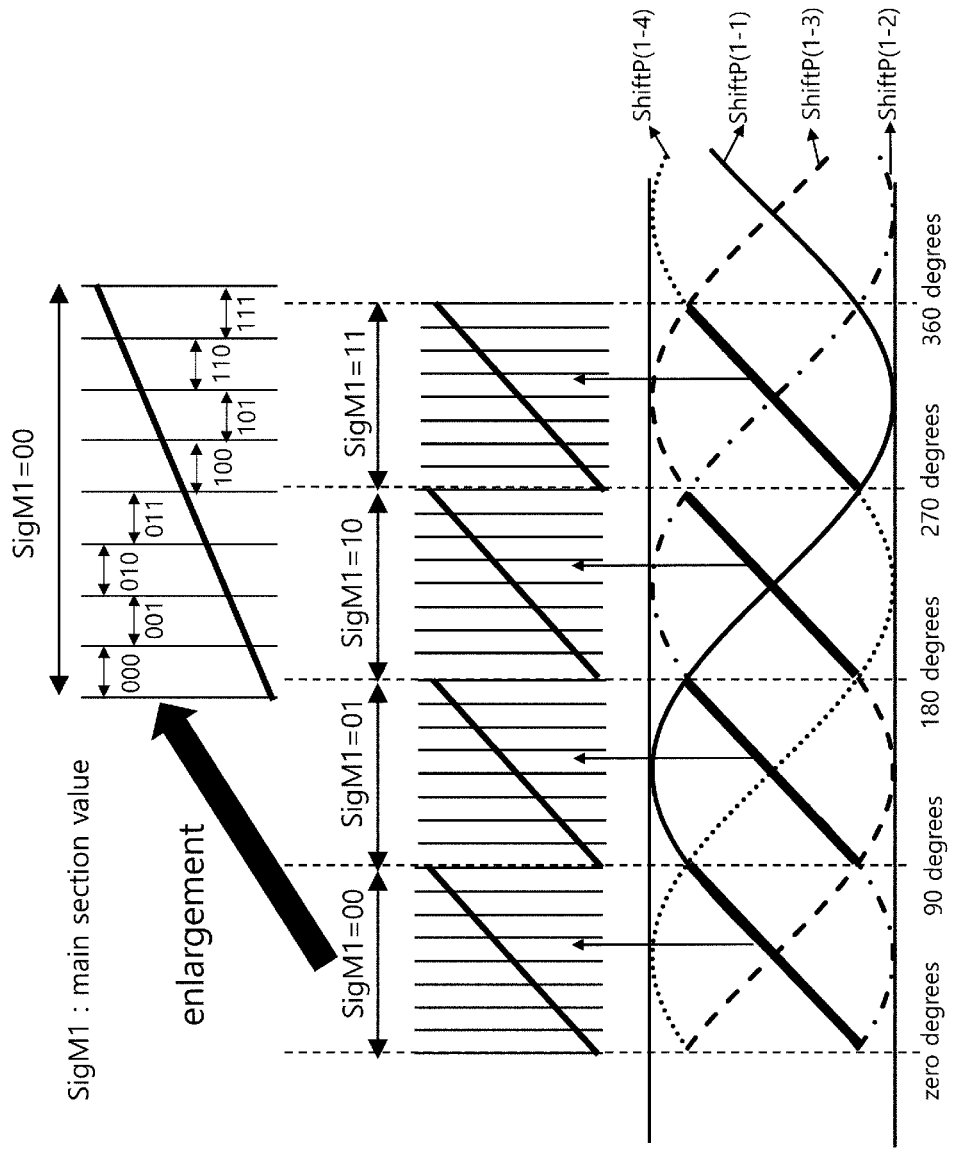
FIG. 6 is an explanatory view illustrating sub-section values.

FIG. 6 is an explanatory view illustrating sub-section values.

That is, with respect to a first main section, sub-section values cause the 1-1th shift difference values to correspond to respective three bits, i.e., a 1-1th sub-section to a 1-8 sub-section, which are eight sub-sections.

That is, the sub-section values may represent the respective 1-1th sub-section to 1-8th sub-section as "000" to "111" with three bits. For example, when a relevant 1-1th shift difference value corresponds to the 1-1th sub-section, a corresponding sub-section value becomes "000".

Similarly, with respect to a second main section, sub-section values cause the 1-2 shift difference values to correspond to respective three bits, i.e., a 1-1th sub-section to a 1-8th sub-section, which are eight sub-sections.

That is, the sub-sections to be allocated are determined according to magnitudes of respective the 1-1th shift difference value to the 1-4th shift difference value.

The lower section value calculator 238a calculates lower section values calculated by the 1-1th digital signal and the 1-2th digital signal for each first signal section value. That is, the lower section values are values for dividing each of the first signal section values into K lower angle values. Here, K is a natural number greater than or equal to four.

Specifically, in the lower sections, each lower section is expressed as K number of lower angle values for each first signal section value. For example, when the number of first signal sections is four, a first lower section value to a fourth lower section value may be calculated. In addition, the first lower section value to the fourth lower section value are values in which each of the lower section values is expressed by Y bits. When a first signal section value is "00", a first lower section value is used and K is $2^Y$. That is, the lower section values are the values for dividing the respective first signal section values into K lower angle values. When Y is 16, K becomes $2^{16}$.

The lower section values may be calculated as the first lower section value to the fourth lower section value as shown in the following [Equation 6] according to the first signal section values. For example, the first lower section value may be used when a first signal section value is "00", the second lower section value may be used when the first signal section value is "01", the third lower section value may be used when the first signal section value is "10", and the fourth lower section value may be used when the first signal section value is "11".

$$L(1-1)=SIN(\alpha)+COS(\alpha\_B)$$

$$L(1-2)=SIN(\alpha\_B)+COS(\alpha\_B)$$

$$L(1-3)=SIN(\alpha)+COS(\alpha\_B)$$

$$L(1-4)=SIN(\alpha\_B)+COS(\alpha\_B) \quad \text{[Equation 6]}$$

In Equation 6, L(1-1) to L(1-4) respectively represent the first lower section value to the fourth lower section value. In addition, $\alpha\_B$ represents an inverted signal of $\alpha$, that is, $-\alpha$.

The angle output part 239a outputs absolute angle data of the positions of the magnet. For example, when the first track TR1 has 32 pairs of N poles and S poles alternately and repeatedly connected to each other and the second track TR2 has 31 pairs of N poles and S poles alternately and repeatedly connected to each other, the absolute angle data calculated by the angle output part 239a may include the following bits.

main section values: values each constituting the uppermost two bits and divide one rotation of 360 degrees of the magnet into the first main section to the fourth main section, which are the four 90 degree sections.

sub-section values: values that constitute lower bits of each main section value, and constitute three bits of data for each main section value. That is, the sub-section values calculate the absolute angle with resolution of 11.25 degrees obtained by dividing one main section of 90 degrees by eight.

first signal section values: values that are calculated by using the sign of the 1-1th digital signal and the sign of the 1-2th digital signal, and constitute lower two bits of respective sub-section values. That is, the absolute angle is calculated with resolution of 2.8125 degrees obtained by dividing 360 degrees by a value obtained by calculating (32 pairs of poles×four first signal sections).

lower section values: values calculated by the 1-1th digital signal and the 1-2th digital signal for each first signal section value. The lower section values constitute lower 16 bits of respective first signal section values.

Figure 7:
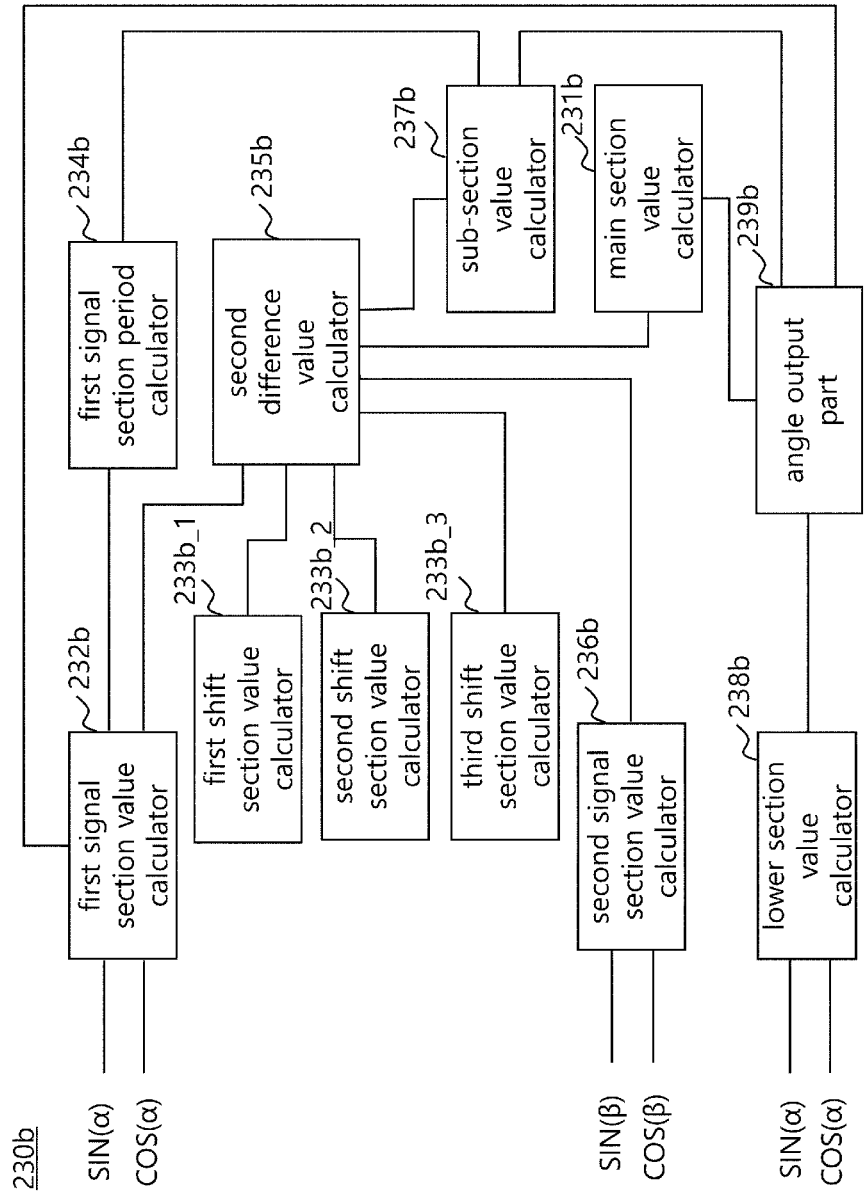
FIG. 7 is a block diagram illustrating an absolute angle calculation unit according to a second exemplary embodiment.

FIG. 7 is a block diagram illustrating an absolute angle calculation unit 230b according to a second exemplary embodiment.

As may be seen from FIG. 7, the absolute angle calculation unit 230b according to the second exemplary embodiment may be configured to include: a main section value calculator 231b, a first signal section value calculator 232b, a first shift section value calculator 233b_1, a second shift section value calculator 233b_2, a third shift section value calculator 233b_3, a first signal section period calculator 234b, a second difference value calculator 235b, a second signal section value calculator 236b, a sub-section value calculator 237b, a lower section value calculator 238b, and an angle output part 239b.

For reference, the absolute angle calculation unit 230b according to the second exemplary embodiment may be used to calculate a rotation angle of a motor at a corresponding rotation position when the motor is rotating.

In addition, when each component of the absolute angle calculation unit 230b according to the second exemplary embodiment is used with the same name as that of each component of the absolute angle calculation unit 230a according to the first exemplary embodiment, unless otherwise stated, it is natural that each component of the absolute angle calculation unit 230b includes all the features of the same name component of the absolute angle calculation unit 230a according to the first exemplary embodiment.

The main section value calculator 231b calculates the main section values for dividing one rotation of 360 degrees of the magnet into a first main section to a fourth main section, which are the four 90 degree sections. For reference, the main section values may be calculated by various methods.

Figure 8:
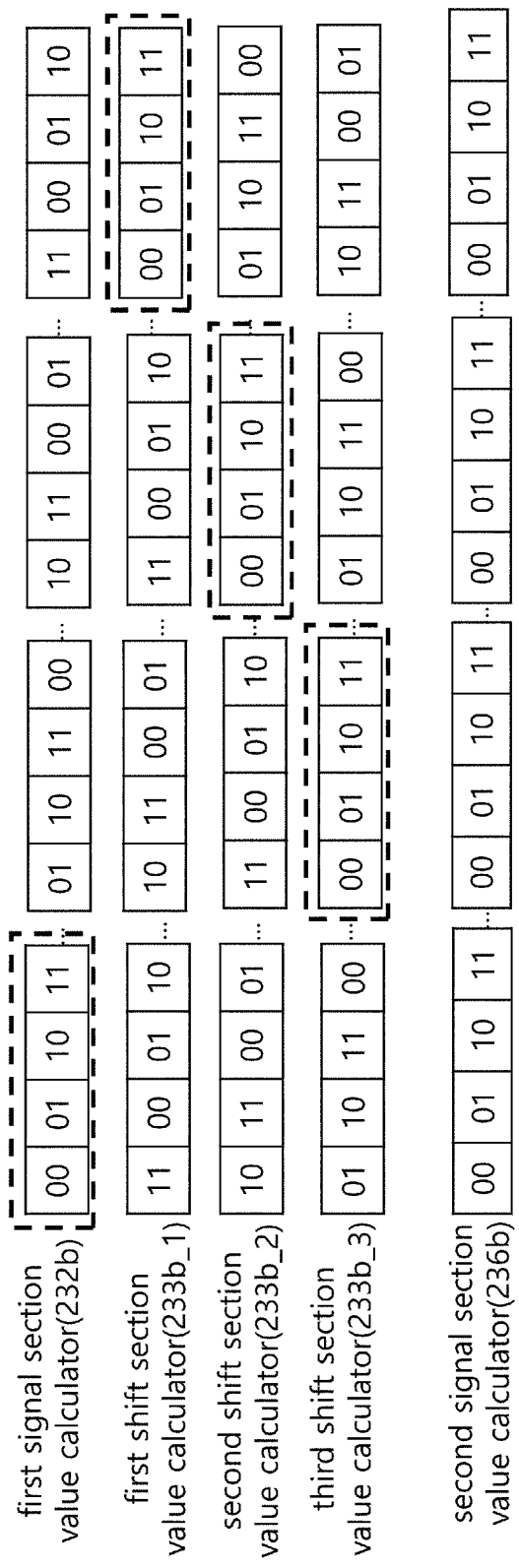
FIG. 8 is an explanatory view illustrating a first signal section value calculator, a first shift section value calculator, a second shift section value calculator, and a third shift section value calculator.

FIG. 8 is an explanatory view illustrating the first signal section value calculator 232b, the first shift section value calculator 233b_1, the second shift section value calculator 233b_2, and the third shift section value calculator 233b_3.

The first signal section value calculator 232b uses the sign of the 1-1th digital signal and the sign of the 1-2th digital signal, so as to calculate and store the first signal section values obtained by dividing the magnetic field signal of the first track TR1 into four first signal sections. When being expressed with two bits, the first signal section values may be expressed as "00", "01", "10", and "11".

The first shift section value calculator 233b_1 shifts a first signal section value by one first signal section in a first direction, so as to calculate the first signal section value shifted by one section. In addition, the second shift section value calculator 233b_2 shifts a first signal section value by two first signal sections in the first direction, so as to calculate the first signal section value shifted by two sections. In addition, the third shift section value calculator 233b_3 shifts a first signal section value by three first signal sections in the first direction, so as to calculate the first signal section value shifted by three sections.

The first direction is either a left direction or a right direction of a register used as the first signal section value calculator 232b.

The second signal section value calculator 236b uses a sign of the 2-1th digital signal and a sign of the 2-2th digital signal, so as to calculate and store second signal section values obtained by dividing the magnetic field signal of the second track TR2 into four second signal sections. When being expressed with two bits, the second signal section values may be expressed as "00", "01", "10", and "11".

That is, the second signal section values may also be set by the same method as the first signal section values.

By using the first signal section values, the first signal section period calculator 234b serves to calculate a first signal section period in which four first signal sections are repeated. For example, the first signal section period may be calculated by using respective first signal section values from a time point when a current "00" is started to a time point when the next "00" is started. By calculating the first signal section period, the rotation speed of the motor may be reflected, and thus respondence may be available according to the speed of the motor.

The second difference value calculator 235b sequentially uses one of an unshifted first signal section value, a first signal section value shifted by one section, a first signal section value shifted by two sections, a first signal section value shifted by three sections, so as to calculate each second difference value, which is a difference of a change point between the corresponding first signal section value and second signal section value.

Figure 9:
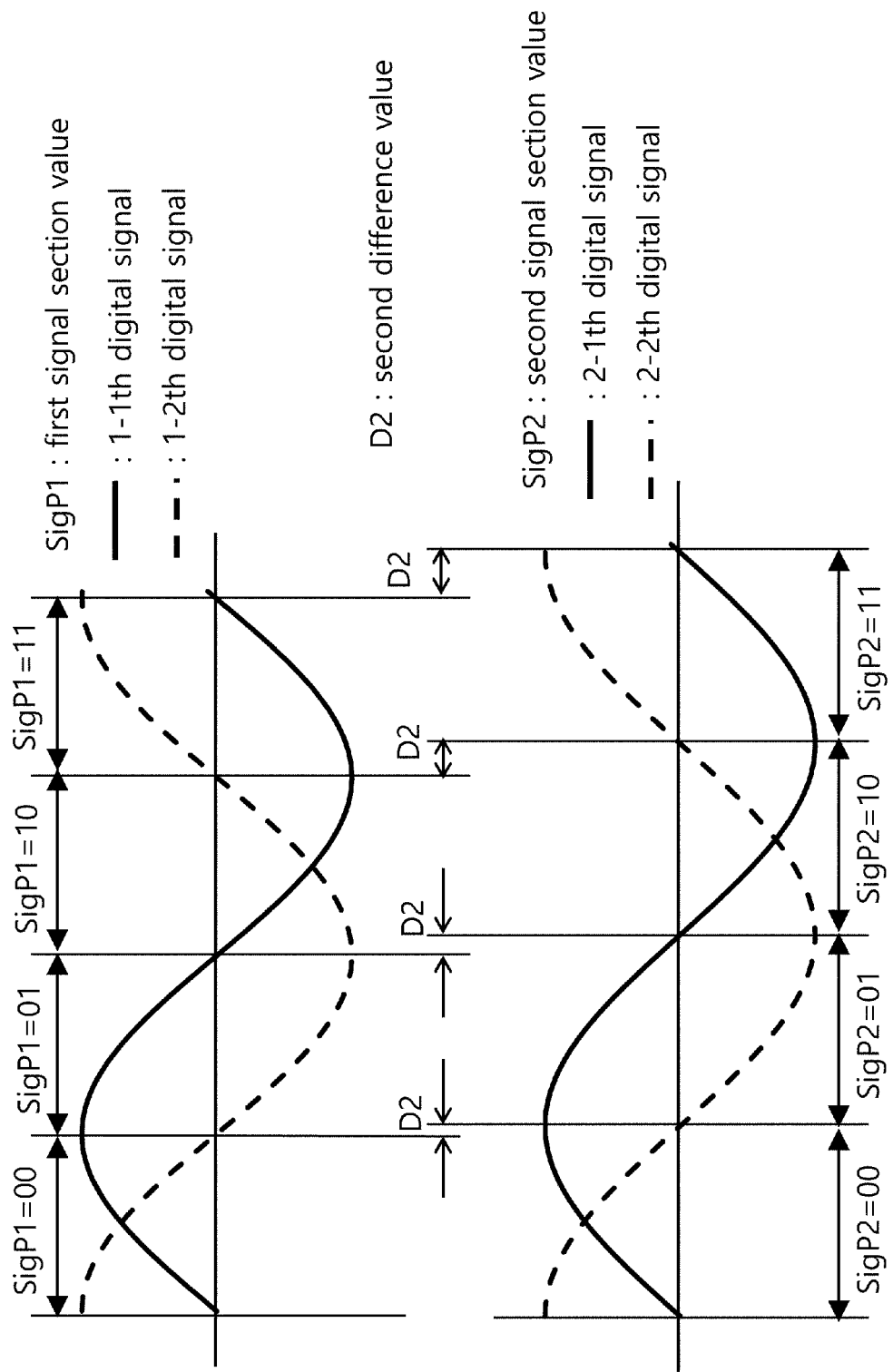
FIG. 9 is an explanatory view illustrating a process of calculating second difference values.

FIG. 9 is an explanatory view illustrating a process of calculating second difference values, and FIG. 10 is a waveform diagram illustrating a result of the calculated second difference values.

Each second difference value is a value corresponding to the phase difference between the magnetic field signal of the first track TR1 and the magnetic field signal of the second track TR2. That is, each second difference value is a value obtained from a difference between the number of pairs of N poles and S poles constituting the first track TR1 and the number of pairs of N poles and S poles constituting the second track TR2. When a value corresponding to a second difference value of 90 degrees is calculated, second difference values are consecutively calculated by using the other one from one of the unshifted first signal section value, the first signal section value shifted by one section, the first signal section value shifted by two sections, and the first signal section value shifted by three sections.

That is, it is assumed that the number of pairs of N poles and S poles constituting the first track TR1 is 32, and the number of pairs of N poles and S poles constituting the second track TR2 is 31. A second difference value is calculated by using a first signal section value, and the second difference value is consecutively calculated until an eighth magnet pair of the first track TR1 where a second difference value is 90 degrees. When the second difference value becomes 90 degrees, a second difference value is calculated by using a first signal section value shifted by three sections, and the second difference value is consecutively calculated until a 16th pole pair of the first track TR1 where the second difference value becomes 90 degrees. Similarly, when the second difference value becomes 90 degrees, a second difference value is calculated by using a first signal section value shifted by two sections, and the second difference value is consecutively calculated until a 24th pole pair of the first track TR1 where the second difference value becomes 90 degrees. Finally, when the second difference value becomes 90 degrees, a second difference value is calculated by using a first signal section value shifted by one section, and the second difference value is consecutively calculated until a 32th pole pair of the first track TR1 where the second difference value becomes 90 degrees.

In summary, each second difference value appears in a form of repeating a linear function having a maximum value at 90 degrees. Each of the four 90-degree sections represents a value calculated by a difference of the change point by one of the values, including: the first signal section value and the second signal section value; the first signal section value and the second signal section, which are shifted by one section; the first signal section value and the second signal section, which are shifted by two sections; and the first signal section value and the second signal section, which are shifted by three sections.

Main section values may be calculated by using second difference values. For example, by setting the second difference value at intervals of 90 degrees, the main section values are set as a first main section to a fourth main section. That is, a section in which the second difference value is initially from 0 degrees to 90 degrees may be set as the first main section, and a section in which the second difference value is next from 0 degrees to 90 degrees may be set as the second main section. The first main section to the fourth main section may be set as "00", "01", "10", and "11" by the respective main section values of two bits.

The sub-section value calculator 237b uses values obtained by dividing the second difference values by the first signal section period, so as to calculate sub-section values that are values corresponding the first main section to the fourth main section to P sections of a 2-1th sub-section to a 2-Pth sub-section. That is, the sub-section values are values obtained by normalizing the second difference values divided by the first signal section period, regardless of the motor speed. Here, P is a natural number greater than or equal to two.

For example, the sub-section values correspond to the second difference values, which are normalized with respect to the first main section, to the 2-1th sub-section to the 2-8th sub-section, which are eight pieces of 3-bit sub-sections. That is, the sub-section values may respectively represent the 2-1th sub-section to the 2-8th sub-section as "000" to "111" with three bits. In addition, when a normalized relevant second difference value corresponds to the 2-1th sub-section, a sub-section value becomes "000". That is, the sub-sections to be allocated are determined according to magnitudes of the normalized second difference values.

The lower section value calculator 238b calculates lower section values calculated by the 1-1th digital signal and 1-2th digital signal for each first signal section value.

The angle output part 239b outputs absolute angle data including bits of the main section values, the sub-section values, the first signal section values, and the lower section values.

An angle measurement method based on a magnetic method according to the exemplary embodiment will be described.

Since the angle measurement method based on the magnetic method according to the exemplary embodiment uses the above-described angle measurement system 1000, it is natural that even when there is no separate description, the method includes all the features of the angle measurement system 1000. In addition, each step of the angle measurement method based on the magnetic method according to the exemplary embodiment may be performed by at least one or a combination of an analog circuit, a digital circuit, a processor, and a memory.

The angle measurement method based on the magnetic method includes: a first analog-to-digital conversion step S10 of outputting a 1-1th digital signal and a 1-2th digital signal, which are digital signals, by receiving an input of an output of at least one 1-1th sensor H11 and an output of at least one 1-2th sensor H12, which are for measuring a magnetic field signal of a first track TR1; a second analog-to-digital conversion step S20 of outputting a 2-1th digital signal and a 2-2th digital signal, which are digital signals, by receiving an input of an output of at least one 2-1th sensor H21 and an output of at least one 2-2th sensor H22, which are for measuring a magnetic field signal of a second track TR2; and absolute angle calculation steps S30A and S30B of calculating an absolute angle of a position of a magnet by using the 1-1th digital signal, the 1-2th digital signal, the 2-1th digital signal, and the 2-2th digital signal.

That is, the first analog-to-digital conversion step S10 is configured to receive the input of the analog signals from a plurality of sensors H11 and H12 that have measured the magnetic field signal of the first track TR1, and convert the analog signals into the digital signals. The second analog-to-digital conversion step S20 is configured to receive the input of the analog signals from a plurality of sensors H21 and H22 that have measured the magnetic field signal of the second track TR2, and convert the analog signals into the digital signals In addition, the 1-1th digital signal and the 1-2th digital signal are sinusoidal signals having a phase difference of 90 degrees from each other. Similarly, the 2-1th digital signal and the 2-2th digital signal are sinusoidal signals having a phase difference of 90 degrees from each other.

An absolute angle of a position of a magnet is configured to include at least one piece of data, including: a main section value obtained by dividing one rotation of 360 degrees of the magnet into four 90 degree sections, which are a first main section to a fourth main section; sub-section values obtained by dividing each of the first main section to the fourth main section into a plurality of sections by a value using a phase difference between a magnetic field signal of a first track and a magnetic field signal of a second track; first signal section values obtained by dividing the magnetic field signal of the first track into four first signal sections by using a sign of a 1-1th digital signal and a sign of a 1-2th digital signal; and lower section values calculated by the 1-1th digital signal and the 1-2th digital signal for each of the first signal section values.

The absolute angle calculation step S30A according to the first exemplary embodiment will be described.

Since the absolute angle calculation step S30A according to the first exemplary embodiment uses the absolute angle calculation unit 230a according to the first exemplary embodiment described above, even though there is no separate description, it is natural that the absolute angle calculation step S30A includes all the features of the absolute angle calculation unit 230a according to the first exemplary embodiment.

The absolute angle calculation step S30A according to the first exemplary embodiment includes: a main section value calculation step S31A, a first signal section value calculation step S32A, a first difference value calculation step S33A, a data conversion step S34A, a shift difference value calculation step S35A, a sub-section value calculation step S36A, a lower section value calculation step S37A, and an angle output step S38A.

The main section value calculation step S31A calculates the main section values for dividing one rotation of 360 degrees of the magnet into a first main section to a fourth main section, which are four 90 degree sections. For reference, the main section value may be calculated by various methods.

The first signal section value calculation step S32A uses a sign of a 1-1th digital signal and a sign of a 1-2th digital signal, so as to calculate the first signal section values obtained by dividing the magnetic field signal of the first track TR1 into four first signal sections.

In addition, the first difference value calculation step S33A uses the 1-1th digital signal, the 1-2th digital signal, the 2-1th digital signal, and the 2-2th digital signal, so as to calculate a 1-1th difference value to a 1-4th difference value, which are values embedding a phase difference between the magnetic field signal of TR1 and the magnetic field signal of the second track TR2. Each of the 1-1th difference value to the 1-4th difference value is calculated as an unsigned value with no sign.

In the data conversion step S34A, the 1-1th difference value to the 1-4th difference value are respectively converted to the 1-1th signed difference value to the 1-4th signed difference value, which are signed values. The shift difference value calculation step S35A calculates a 1-1th shift difference value to a 1-4th shift difference value, which are obtained by phase shifting each of the 1-1th difference value to the 1-4th difference value by 45 degrees by using a plurality of the 1-1th signed difference value to the 1-4th signed difference value.

For reference, the main section values may be calculated by using values calculated by using the 1-1th difference value to the 1-4th difference value. Specifically, the main section value may be calculated by using the 1-1th signed difference value to the 1-4th signed difference value, which are the values using the 1-1th difference value to the 1-4th difference value. However, each of the 1-1th signed difference value to the 1-4th signed difference value also embed a phase difference between the magnetic field signal of the first track TR1 and the magnetic field signal of the second track TR2. That is, the main section value may be calculated by using each value embedding the phase difference between the magnetic field signal of the first track and the magnetic field signal of the second track.

For each main section value, the sub-section value calculation step S36A calculates sub-section values that correspond one of the 1-1th shift difference value to 1-4th shift difference value to the 1-1th sub-section to 1-Mth sub-section. M is a natural number greater than or equal to two.

The lower section value calculation step S37A calculates lower section values calculated by the 1-1th digital signal and the 1-2th digital signal for each first signal section value. The lower section values are values for dividing each first signal section value into K lower angle values. Here, K is a natural number greater than or equal to four.

The angle output step S38A outputs absolute angle data of the positions of the magnet including the main section values. Specifically, the absolute angle data calculated in the angle output step S38A may include bits of the main section values, the sub-section values, the first signal section values, and the lower section values.

The absolute angle calculation step S30B according to the second exemplary embodiment will be described.

Since the absolute angle calculation step S30B according to the second exemplary embodiment uses the absolute angle calculation unit 230b according to the second exemplary embodiment described above, even though there is no separate description, it is natural that the absolute angle calculation step S30B includes all the features of the absolute angle calculation unit 230b according to the second exemplary embodiment.

The absolute angle calculation step S30B according to the second exemplary embodiment includes a main section value calculation step S31B, a first signal section value calculation step S32B, a first shift section value calculation step S33B_1, a second shift section value calculation step S33B_2, a third shift section value calculation step S33B_3, a first signal section period calculation step S34B, a second signal section value calculation step S35B, a second difference value calculation step S36B, a sub-section value calculation step S37B, a lower section value calculation step S38B, and an angle output step S39B.

The main section value calculation step S31B calculates main section values dividing one rotation of 360 degrees of a magnet into a first main section to a fourth main section, which are four 90 degree sections.

In addition, the first signal section value calculation step S32B uses a sign of a 1-1th digital signal and a sign of a 1-2th digital signal, so as to calculate first signal section values obtained by dividing a magnetic field signal of a first track TR1 into four first signal sections.

The first shift section value calculation step S33B_1 shifts a first signal section value by one first signal section in a first direction, so as to calculate the first signal section value shifted by one section. In addition, the second shift section value calculation step S33B_2 shifts a first signal section value by two first signal section in the first direction, so as to calculate the first signal section value shifted by two sections. The third shift section value calculation step S33B_3 shifts a first signal section value by three first signal sections in the first direction, so as to calculate the first signal section value shifted by three sections. The first direction is either a left direction or a right direction of a register used for calculating the first signal section value.

The first signal section period calculation step S34B calculates, by using the first signal section values, a first signal section period in which four first signal sections are repeated.

The second signal section value calculation step S35B uses a sign of a 2-1th digital signal and a sign of a 2-2th digital signal, so as to calculate second signal section values divided into four second signal sections. In addition, the second difference value calculation step S36B sequentially uses one of an unshifted first signal section value, a first signal section value shifted by one section, a first signal section value shifted by two sections, a first signal section value shifted by three sections, so as to calculate each second difference value, which is a difference of a change point between the corresponding first signal section value and the second signal section value.

In addition, the main section values are calculated by using the second difference values.

The sub-section value calculation step S37B uses values obtained by dividing the second difference values by the first signal section period, so as to calculate sub-section values corresponding each of the first main section to the fourth main section to P sections of a 2-1th sub-section to a 2-Pth sub-section. Here, P is a natural number greater than or equal to two.

The lower section value calculation step S38B calculates lower section values on the basis of the 1-1th digital signal and the 1-2th digital signal for each first signal section value. The lower section values are values for dividing each first signal section value into K lower angle values. K is a natural number greater than or equal to four.

The angle output step S39B outputs absolute angle data of the position of the magnet including the main section values. Specifically, the absolute angle data calculated in the angle calculation step S39B may include bits of main section values, sub-section values, first signal section values, and lower section values.

As described above, according to the angle measurement system 1000 based on the magnetic method and the measurement method therefor of the present disclosure, it may be confirmed that the absolute angle at the time when the motor is stopped and/or rotated may be measured with the high resolution.

What is claimed is:

1. An angle measurement system configured to use a magnet and provided with a first track and a second track, the angle measurement system comprising:
   an absolute angle calculation unit configured to calculate an absolute angle of a position of the magnet by using a 1-1th digital signal obtained by measuring a magnetic field signal of the first track and converted into a digital signal, a 1-2th digital signal obtained by measuring the magnetic field signal of the first track and converted into a digital signal, a 2-1th digital signal obtained by measuring a magnetic field signal of the second track and converted into a digital signal, and a 2-2th digital signal obtained by measuring the magnetic field signal of the second track and converted into a digital signal,
   wherein the 1-1th digital signal and the 1-2th digital signal are sinusoidal signals having a phase difference of 90 degrees from each other, and the 2-1th digital signal and the 2-2th digital signal are sinusoidal signals having a phase difference of 90 degrees from each other, and
   wherein an absolute angle of the position of the magnet is configured to comprise at least one piece of data comprising:
   main section values obtained by dividing one rotation of 360 degrees of the magnet into a first main section to a fourth main section, which are four 90 degree sections;
   sub-section values obtained by dividing each of the first main section to the fourth main section into a plurality of sections by a value using the phase difference between the magnetic field signal of the first track and the magnetic field signal of the second track;

first signal section values obtained by dividing the magnetic field signal of the first track into four first signal sections by using a sign of the 1-1th digital signal and a sign of the 1-2th digital signal; and lower section values calculated by the 1-1th digital signal and the 1-2th digital signal for each first signal section value.

2. An angle measurement system configured to use a magnet and provided with a first track and a second track, the angle measurement system comprising:

an absolute angle calculation unit configured to calculate an absolute angle of a position of the magnet by using a 1-1th digital signal obtained by measuring a magnetic field signal of the first track and converted into a digital signal, a 1-2th digital signal obtained by measuring the magnetic field signal of the first track and converted into a digital signal, a 2-1th digital signal obtained by measuring a magnetic field signal of the second track and converted into a digital signal, and a 2-2th digital signal obtained by measuring the magnetic field signal of the second track and converted into a digital signal, wherein the 1-1th digital signal and the 1-2th digital signal are sinusoidal signals having a phase difference of 90 degrees from each other, and the 2-1th digital signal and the 2-2th digital signal are sinusoidal signals having a phase difference of 90 degrees from each other, and wherein the absolute angle calculation unit is configured to comprise:

a main section value calculator for calculating main section values that divides one rotation of 360 degrees of the magnet into the first main section to the fourth main section, which are the four 90 degree sections;

an angle output part for outputting absolute angle data of a position of the magnet comprising the main section values;

a first signal section value calculator for calculating first signal section values obtained by dividing the magnetic field signal of the first track into four first signal sections by using a sign of the 1-1th digital signal and a sign of the 1-2th digital signal; and a lower section value calculator for calculating lower section values that divides each of the first signal section values into K lower angle values by the 1-1th digital signal and the 1-2th digital signal for each first signal section value.

3. The angle measurement system of claim 2, wherein the absolute angle calculation unit is configured to further comprise:

a first shift section value calculator for calculating a first signal section value shifted by one section by shifting the first signal section value by one first signal section in a first direction;

a second shift section value calculator calculating a first signal section value shifted by two sections by shifting the first signal section value by two first signal sections in the first direction;

a third shift section value calculator for calculating a first signal section value shifted by three sections by shifting the first signal section value by three first signal sections in the first direction; and a first signal section period calculator for calculating, by using the first signal section values, a first signal section period in which the four first signal sections are repeated, wherein the first direction is either a left direction or a right direction of a register used as the first signal section value calculator.

4. The angle measurement system of claim 3, wherein the absolute angle calculation unit is configured to further comprise:

a second signal section value calculator for calculating second signal section values divided into four second signal sections by using a sign of the 2-1th digital signal and a sign of the 2-2th digital signal; and a second difference value calculator for calculating each second difference value that is a difference of a change point between the corresponding first signal section value and the second signal section value by sequentially using one of the unshifted first signal section value, the first signal section value shifted by one section, the first signal section value shifted by two sections, and the first signal section value shifted by three sections, wherein the main section values are calculated by using the second difference values.

5. The angle measurement system of claim 4, wherein the absolute angle calculation unit is configured to further comprise:

a sub-section value calculator for calculating sub-section values respectively corresponding the first main section to the fourth main section into P sections of a 2-1th sub-section to a 2-Pth sub-section by using a value obtained by dividing the second difference values by the first signal section period, wherein P is a natural number of greater than or equal to two.

6. An angle measurement method configured to use a magnet and provided with a first track and a second track, the angle measurement method comprising:

an absolute angle calculation step of calculating an absolute angle of a position of the magnet by using a 1-1th digital signal obtained by measuring a magnetic field signal of the first track and converted into a digital signal, a 1-2th digital signal obtained by measuring the magnetic field signal of the first track and converted into a digital signal, a 2-1th digital signal obtained by measuring a magnetic field signal of the second track and converted into a digital signal, and a 2-2th digital signal obtained by measuring the magnetic field signal of the second track and converted into a digital signal, wherein the 1-1th digital signal and the 1-2th digital signal are sinusoidal signals having a phase difference of 90 degrees from each other, and the 2-1th digital signal and the 2-2th digital signal are sinusoidal signals having a phase difference of 90 degrees from each other, wherein an absolute angle of the position of the magnet is configured to comprise at least one piece of data comprising:

main section values obtained by dividing one rotation of 360 degrees of the magnet into a first main section to a fourth main section, which are four 90 degree sections;

sub-section values obtained by dividing each of the first main section to the fourth main section into a plurality of sections by a value using the phase difference between the magnetic field signal of the first track and the magnetic field signal of the second track;

first signal section values obtained by dividing the magnetic field signal of the first track into four first signal sections by using a sign of the 1-1th digital signal and a sign of the 1-2th digital signal; and lower section values calculated by the 1-1th digital signal and the 1-2th digital signal for each first signal section value.

7. An angle measurement method configured to use a magnet and provided with a first track and a second track, the angle measurement method comprising:

an absolute angle calculation step of calculating an absolute angle of a position of the magnet by using a 1-1th digital signal obtained by measuring a magnetic field signal of the first track and converted into a digital signal, a 1-2th digital signal obtained by measuring the magnetic field signal of the first track and converted into a digital signal, a 2-1th digital signal obtained by measuring a magnetic field signal of the second track and converted into a digital signal, and a 2-2th digital signal obtained by measuring the magnetic field signal of the second track and converted into a digital signal, wherein the 1-1th digital signal and the 1-2th digital signal are sinusoidal signals having a phase difference of 90 degrees from each other, and the 2-1th digital signal and the 2-2th digital signal are sinusoidal signals having a phase difference of 90 degrees from each other, and wherein the absolute angle calculation step comprises:

a main section value calculation step of calculating main section values that divides one rotation of 360 degrees of the magnet into the first main section to the fourth main section, which are the four 90 degree sections;

an angle output step of outputting absolute angle data of a position of the magnet comprising the main section values;

a first signal section value calculation step of calculating first signal section values obtained by dividing the magnetic field signal of the first track into four first signal sections by using a sign of the 1-1th digital signal and a sign of the 1-2th digital signal; and a lower section value calculation step of calculating lower section values that divides each of the first signal section values into K lower angle values by the 1-1th digital signal and the 1-2th digital signal for each first signal section value.

8. The angle measurement method of claim 7, wherein the absolute angle calculation step further comprises:

a first shift section value calculation step of calculating a first signal section value shifted by one section by shifting the first signal section value by one first signal section in a first direction;

a second shift section value calculation step of calculating a first signal section value shifted by two sections by shifting the first signal section value by two first signal sections in the first direction; and a third shift section value calculation step of calculating a first signal section value shifted by three sections by shifting the first signal section value by three first signal sections in the first direction; and a first signal section period calculation step of calculating, by using the first signal section values, a first signal section period in which the four first signal sections are repeated, wherein the first direction is either a left direction or a right direction of a register used as the first signal section value calculator.

9. The angle measurement method of claim 8, wherein the absolute angle calculation step further comprises:

a second signal section value calculation step of calculating second signal section values divided into four second signal sections by using a sign of the 2-1th digital signal and a sign of the 2-2th digital signal; and a second difference value calculation step of calculating each second difference value that is a difference of a change point between the corresponding first signal section value and the second signal section value by sequentially using one of the unshifted first signal section value, the first signal section value shifted by one section, the first signal section value shifted by two sections, and the first signal section value shifted by three sections, wherein the main section values are calculated by using the second difference values.

10. The angle measurement method of claim 9, wherein the absolute angle calculation step further comprises:

a sub-section value calculation step of calculating sub-section values respectively corresponding the first main section to the fourth main section into P sections of a 2-1th sub-section to a 2-Pth sub-section by using a value obtained by dividing the second difference values by the first signal section period, wherein P is a natural number of greater than or equal to two.

* * * * *